United States Patent [19]

Anderson et al.

[11] Patent Number: 5,006,248

[45] Date of Patent: Apr. 9, 1991

[54] METAL OXIDE POROUS CERAMIC MEMBRANES WITH SMALL PORE SIZES

[75] Inventors: Marc A. Anderson; Qunyin Xu, both of Madison, Wis.

[73] Assignee: Wisconsin Alumni Research Foundation, Madison, Wis.

[21] Appl. No.: 563,013

[22] Filed: Aug. 6, 1990

Related U.S. Application Data

[63] Continuation-in-part of Ser. No. 425,668, Oct. 23, 1989.

[51] Int. Cl.$^5$ .............................................. B01D 63/00
[52] U.S. Cl. ........................ 210/500.25; 210/500.26; 210/510.1
[58] Field of Search ...................... 210/500.26, 500.25, 210/510.1; 264/48, 63, 45.5; 106/436, 437, 122; 501/12; 252/315.01

[56] References Cited

U.S. PATENT DOCUMENTS 4,929,406  5/1990  Abe et al. ............................ 264/45.5

*Primary Examiner*—Frank Sever
*Attorney, Agent, or Firm*—Quarles & Brady

[57] ABSTRACT

A method is disclosed for the production of metal oxide ceramic membranes of very small pore size. The process is particularly useful in the creation of titanium and other transition metal oxide membranes. The method utilizes a sol-gel process in which the rate of particle formation is controlled by substituting a relatively large alcohol in the metal alkoxide and by limiting the available water. Stable, transparent metal oxide ceramic membranes are created having a narrow distribution of pore size, with the pore diameter being manipulable in the range of 5 to 40 Angstroms.

4 Claims, No Drawings

METAL OXIDE POROUS CERAMIC MEMBRANES WITH SMALL PORE SIZES

CROSS REFERENCE TO RELATED APPLICATION

This application is a continuation-in-part of application Ser. No. 07/425,668 filed Oct. 23, 1989.

FIELD OF THE INVENTION

The present invention relates to the creation of metal oxide ceramic membranes in general, and relates, in particular, to a method for producing porous metal oxide ceramic membranes having very small pore sizes.

Ceramic membranes are materials having a variety of industrial and scientific uses, the most common of which is use in separation processes. Metal oxide ceramic membranes are formed through a process beginning with organic-inorganic molecules which are formed into small metal oxide particles, which are then fused into a unitary ceramic material. The gaps between the fused particles form a series of pores so that the membrane is porous. While organic membranes are most often used currently in industry for separation processes, the use of ceramic membranes offers several advantages over organic membranes. Metal oxide ceramic membranes have a greater chemical stability, since they are resistant to organic solvents, chlorine, and extremes of pH, to which organic membranes may be susceptible. Ceramic membranes are also inherently more stable at high temperatures, to allow efficient sterilization of process equipment not possible with organic membranes. Metal oxide ceramic membranes are also entirely inorganic, so they are generally quite stable and resistant to microbial or biological degradation which can occasionally be a problem with organic membranes. Durable metal oxide ceramic membranes are also relatively stable materials, which can resist greater extremes of temperature and chemical activity than less durable membrane compositions. One limitation on the use of such metal oxide ceramic membranes has been the practical limitation on both the absolute size and the range of size of the pores which can be created in the metal oxide membranes. Clearly, if a membrane is to be used for filtration or other form of separation, the size and the variance in size of the pores through the membrane are a critical factor in the suitability of the membrane for the particular separation function desired.

The creation of metal oxide ceramic membranes is generally conducted through a sol-gel procedure. In such a procedure, the metal oxide is typically initiated into the process as a metal alkoxide introduced into water in a reaction vessel in which the water is being rapidly stirred. The addition of the metal alkoxide to water results in the hydrolysis of the metal to metal hydroxide monomers, dimers, polymers, and/or particles, depending on the quantity of water used. Insoluble metal oxide particles are then peptized by the addition of an acid which causes the particles of the metal oxide to have a greater propensity to remain in suspension, presumably due to charges acquired by the particles during the peptizing process. This process is one of charge stabilization. Stabilization could also be accomplished sterically by adding surfactant agents. Such a sol, created in water, can be then dewatered to create a "gel," which is a semisolid material. Further dewatering, and then sintering, of such a gel results in a durable rigid material which can either be formed as an unsupported membrane or as a supported membrane coated onto a substrate, which, in turn, can be either porous or non-porous and metallic or non-metallic, depending on the particular application.

One desirable metal element for use in such a metal oxide ceramic membrane is titanium. Titanium is attractive since it has catalytic and photocatalytic qualities that make a titanium oxide ceramic membrane useful for chemical or photoelectrochemical processes in which a less catalytic or photocatalytic metal oxide ceramic membrane would not be suitable. Also, titanium oxide ceramic membranes are typically transparent or lightly colored, thereby giving them desirable optical properties for certain applications in which transparency is an asset.

At least one teaching is known, by the inventors here, of a method for preparing either polymeric or particulate titanium ceramic membranes by a process which allows the reproducible and predictable fabrication of titanium ceramic membranes which permits in crack-free membranes of predictable qualities to be created. As disclosed in international published PCT patent application WO 89/00983, methods were developed for the creation of both polymeric and particulate ceramic membranes. The method for creating the polymeric ceramic membranes included strictly limiting the amount of water included in the reaction vessel so as to foster the creation of covalent bonds between the titanium and oxygen molecules in the suspension, and also required the use of an alkyl alcohol different from the alkyl alcohol in the titanium alkoxide for the process to be effective. The process of creating particulate ceramic membranes disclosed in that published patent application involved the use of relatively large amounts of water, and a mild heating during the peptizing step, to create the appropriately charged particles which could then be dewatered and sintered to create a titanium oxide ceramic membrane.

SUMMARY OF THE INVENTION

The present invention is summarized in that a metal oxide ceramic membrane is created which is porous, optically transparent, and which has an average pore diameter of less than 40 Angstroms.

The present invention is also summarized in that a method for creating a particulate metal oxide ceramic membrane of defined very small pore size includes creating a metal alkoxide in which the alkoxyl group has a branched structure and at least four carbon atoms, dissolving the created metal alkoxide in an alcohol solution with a very limited amount of water, very slowly evaporating the alcohol from the suspension thus created, and firing the resulting gel to create a particulate metal oxide ceramic membrane having pore sizes defined by the molarity of the metal in the beginning alcohol and the molar ratio of water to metal alkoxide molecules.

It is an object of the present invention to allow the creation of metal oxide ceramic membranes in general, and titanium oxide ceramic membranes in particular, which have a relatively small pore size, but which can be created in an efficient and predictable manner.

It is yet another object of the present invention to provide a material having great utility in ultrafiltration, reverse osmosis, gas separations, and other separation technologies in offering significant advantages over other prior membranes used for these purposes at present. It would also appear that such small pore size catalytic membranes would be useful in catalysis, photocatalysis, and in sensor and waveguide applications.

Other objects, advantages, and features of the present invention will become apparent from the following specification.

DETAILED DESCRIPTION OF THE INVENTION

The present invention is directed to the preparation of a metal oxide ceramic membrane having a pore diameter of less than 40 Angstroms, and is particularly directed toward the creation of such metal oxides using transition metals such as titanium and zirconium. In the preparation of metal oxide ceramic membranes through the use of a process that involves first creating a sol, dewatering the sol to a gel, and then sintering the gel into a membrane, the creation of very small particles in the sol by limiting the rate of formation or the ultimate size of the metal oxide particles in the sol is an important factor. The size of the particles in the sol can determine the size of the pores between in the membrane, since the model for the microscopic structure of the membrane is a series of particles of irregular spherical shape, which are fused to their neighbors during the sintering process, to form the porous ceramic membrane material. Accordingly, the size of the pores is determined by the size of the particles, since in a random close packing model of the particles in the membrane, the smaller the particles, the smaller are the pores formed by the gaps or spaces between the particles. The use of the large alcohol group in the metal alkoxide precursor, as described here, seems to facilitate the creation of very small particles in the sol stage by limiting the reaction rate of the creation of metal oxide molecular intermediates and thus limits the creation of large particles in the sol. In particular, alcohols of at least four (4) carbon atoms, with a branched structure, such as tert-amyl alcohol, are preferred.

As has been published previously by the inventors of the present specification, it is possible to create both polymeric and particulate titanium ceramic membranes which are porous, stable, and can be made generally crack-free. What has been surprisingly found here is that a process can be defined for making particulate ceramic membranes of very small defined pore size using a process that bears much more similarity to the previous process for creating polymeric titanium ceramic membranes than that previously used to create particulate ceramic membranes of titanium. In fact, the procedure for making small pore membranes described here omits the peptizing step normally associated with the creation of particulate metal oxide ceramic membranes. The small particles here are formed directly from the hydrolytic reaction by using a limited amount of water. However, this alcoholic sol still results in a particulate instead of a polymeric membrane, presumably since the large alcoholic group in the metal alkoxide precursor prevents the partially hydrolyzed intermediates from polycondensation which is the key route to forming polymeric chains.

While the method and product disclosed herein is illustrated in particular with metal oxide ceramic membranes of titanium, zirconium, and a mixture of the two, it has been described previously by others in the field that methods proven to be effective with titanium may also be adapted for use with other metallic oxides, such as those of silicon, aluminum, niobium and other transition metals. Thus the method and product of the present invention has utility for other metals as well, although titanium is considered one of the more difficult metals to work with, of the metals useful for creating metal oxide ceramic membranes, and titanium has particularly unique qualities advantageous in a metal oxide membrane, due to its catalytic and photocatalytic characteristics, not present in some other metal oxides which might also be used in such a membrane.

In general, the process of the present invention begins with the creation of a metal alkoxide in which the alcohol moiety in the metal alkoxide is a large, relatively complex, organic alcohol. It has been typical in prior art methods to utilize the commercially available forms of metal alkoxides. For example, one convenient titanium alkoxide commercially available (Aldrich) is titanium tetra-isopropoxide ($Ti(OPr^i)_4$). It has been found here that the substitution of the alcohol in the beginning titanium alkoxide, by substituting tertamyloxide for isopropoxide, facilitates the creation of small particles in the sol and therefore smaller pore sizes in the resultant titanium ceramic membrane. A similar result has been demonstrated for zirconium as well. Since the phenomenon appears attributable to the relatively large physical size of the alcohol moiety, it would appear that the phenomenon attributable to the creation of the small particle sizes is the effect of the large alcohol moiety in controlling the reaction rate of the creation of metal oxides in the solution by interfering with access to the titanium atom. Accordingly, other large organic alcohols, particularly those of branch shape and having at least four or five carbons, would result in similar control of the reaction rate, and result in the ability to achieve small particle size and small pore size in the membrane.

Since neither titanium nor zirconium tetra-tertamyloxide is known to be commercially available at present, they must be created from readily available materials. One convenient method for creating titanium or zirconium tetra-tert-amyloxide is by an alcohol exchange method, using the precursor commercially available tetra-isopropoxide. This is done by reacting the titanium (or zirconium) tetra-isopropoxide with tert-amyl alcohol in a benzene solvent to yield titanium tetra-tert-amyloxide and isopropanol. Then by distillation, isopropanol can be removed with the benzene as an azeotrope, and then excess tert-amyl-alcohol and benzene can be removed by distillation.

Once the metal tetra-tert-amyloxide is available, the reaction may proceed. The metal alkoxide and a small amount of water are separately dissolved in equal amounts of alcohol, with the alcohol preferably being the same organic alcohol that is the alkoxyl group in the metal alkoxide. The three other critical parameters appear to be the molar concentration of titanium in the ultimate solution, the molar ratio of water molecules to metal atoms, and the pH of the water. These three parameters are interdependent. Thus for a molarity of metal molecules of 0.2 molar, the ratio of water molecules (pH=2) to metal atoms has been found to be conveniently in the range of 1 to 7 to achieve desirable membranes. However, for higher metal concentrations, i.e. a molarity of titanium of 0.4 molar, then a ratio of water molecules (pH=2) to metal atoms should not exceed about 3 before the reaction ceases to function effectively. The pH of the water is another factor which affects the particle size formed in the sol since the protons act as a catalyst for the hydrolytic reactions. Values of pH in the range of about one to three are preferred, with a lower pH generally resulting in smaller particle size. If the water ratio is too high, or if the molarity of the metal atoms becomes too high, the creation of metal oxide molecules becomes prevalent in the solution and a precipitation results, which yields particles of a size higher than is desired in creating the membrane here. However, by limiting the molarity of the metal and the ratio of water to metal, and by adjusting the pH of the water, the size of the particles can be strictly limited in a way that results in efficient creation of finely porous membranes.

Again, the procedure begins with the dissolving of the titanium or other metal alkoxide and water in separate amounts of the alcohol. The two solutions are then mixed together by dropping the water alcohol part into the alkoxide part. The transparent solution resulting is preferably stirred while the reaction continues. This step may require some time since the reaction rate of the formation of metal oxides has been impeded deliberately in order to prevent the creation of large particles. The result is a transparent solution containing suspended very small particles including metal dioxide.

To convert the resultant sol into a gel, the alcohol must be removed from the solution. However, the process must be delicately handled in order to avoid concentrating the very small particles into larger particles than is desired. It has been found that slow alcohol evaporation in a humidity controlled box is a sufficiently slow process to produce clear gels at room temperature. The dried gels then can be fired in air at temperatures not to exceed 400° C. to sinter the gel into a titanium dioxide particulate membrane. It has been further found that during firing the heat of the sintering oven must be raised very slowly in order to prevent carbon deposition on the membrane during firing.

The precursor sols can be tested for the particle size by quasi-elastic light scattering techniques. Using such a technique it has been found that the particles in the sol have a diameter which can be varied down to less than 5 nanometers. The use of transmission electron microscopic imaging of the dried gel has revealed that the dried gel is composed of quantum sized particles having a size of less than 3 nanometers. BET measurements of the resulting membrane fired to 250° C. have indicated that membranes can have a mean pore diameter as small as 14 Angstroms with an extremely narrow distribution of pore size. The BET results also indicate that a large surface area (in excess of 200 square meters per gram) and a very high porosity (39%) can be achieved in such a membrane. By altering the ratio of water to metal and by altering the molarity of metal in the beginning solution, the size of the particles in the solution, and the resulting size of the pores in the membrane, can be controlled between 5 and 40 Angstroms in diameter in a relatively efficient manner. It has also been found that polymeric gelation is completely prevented by the steric effect of the large alcohol group on polycondensation reactions. Particles of different size ranges, in the range of 2 nanometers (20 Angstroms) to 300 nanometers, can be harvested by quenching the particle growth at certain stages using polymeric stabilizing agents, such as polyethylene glycol and hydroxypropyl cellulose. In this fashion tailor-made membranes with desirable pore sizes throughout the range can be obtained by gelatinizing corresponding particle sols. The lower range limit on the size of the pores in such a membrane is difficult to ascertain due to difficulties in measurement of the pores, but particles sized so as to give rise to pores as small as 5 Angstroms have been achieved.

Titanium oxide and other metal oxide porous ceramic membranes containing the small pores, with a relatively narrow distribution of pore size, offer several unique advantages for industrial application. The membranes can be created either coated on a support, or can be made totally unsupported. The membranes can be coated onto porous supports as well, and thus can be used as an excellent filter for separation of small molecules either in gas or liquid phases. Because the metal oxide ceramic materials are highly durable, the membrane is an attractive candidate for carrying out high pressure reverse-osmosis type processes, such as producing ultrapure water and the desalinization of sea water. Since it has been previously demonstrated that titanium in a titanium oxide ceramic membrane retains its catalytic ability, such a titanium oxide ceramic membrane can be used both as a catalyst or catalyst support and can speed up certain reactions by removing unwanted by-products due to the separation functions. It has previously been demonstrated that membranes of this type are photochemically active capable of degrading complex organic molecules such as polychlorinated biphenyls and other environmental contaminates.

The product and process of the present invention can also be better understood with reference to the following example which is intended to be illustrative and not limiting.

EXAMPLES

Particulate TiO$_2$ Membranes

First a supply of the precursor tert-amyloxide was prepared from commercially available materials. As is shown in Equation 1, titanium tetra-isopropoxide (Aldrich) was converted by an alcohol exchange reaction to titanium tetra-tert-amyloxide. This reaction was conducted by the method described by Bradley, et al., *J. Chem. Soc.*, 2027 (1952). The titanium tetra-isopropoxide was reacted with tert-amyl alcohol (t-AmOH) (also Aldrich) in a benzene solvent to yield titanium tetra-tert-amyloxide and isopropanol (i-PrOH). The isopropanol was then removed from the solution by distillation with benzene as an azeotrope at 71.4° C. The removal of the isopropanol was believed necessary to complete the formation of the tetra-tert-amyloxide. Excess t-AmOH and benzene were then removed via additional distillation at above 100° C. The NMR spectrum of the resulting light yellow product was taken to confirm that no isopropanol remained. There may have been trace amounts of t-AmOH in the product.

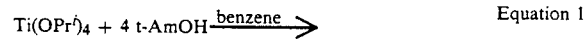

Equation 1

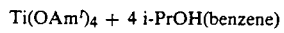

All other chemicals were used without additional purification.

The preparation of the sol was begun by dissolving the titanium alkoxide and acidified water in equal amounts of alcohol. The water was previously acidified to a pH of 2. The desired concentration of the titanium in the solution and the molar ratio of water to titanium in the solution were calculated in advance. Based on a calculation of a molar level of 0.2M of titanium and a molar ration of water to titanium of 6 to 1, 1.19 grams of Ti(OAm$^t$)$_4$ were dissolved in 7.5 milliliters of AmOH while 324 µls of H₂O was introduced into 7.5 ml of AmOH as well. The water fraction was then introduced into the titanium alkoxide fraction by dripping while stirring. The dripping occurred over a fifteen minute time interval at room temperature. While the resulting solution appeared visibly transparent, light scattering measurements indicated small particles (having a diameter less than 5nm) in suspension. The solution, which was 0.2M titanium tetra-tert-amyloxide and 1.2M H₂O, was stirred during an aging time of an additional two hours, also at room temperature.

To turn the sol thus produced into a gel, the alcohol was slowly permitted to evaporate from the sol. The solution was placed in plastic dishes for the gelation which was accomplished by placing the dishes in a humidity controlled box, which was simply a conventional desiccator box without either particular instrumentation or mechanism to control the alcohol level in the chamber. After one week, the dishes were checked. Some produced satisfactory gels after one week while others required a longer gelation time. To avoid cracking, the gels were allowed to dry completely before being removed from the box.

The dried gels were then sintered by firing in a ceramic oven in air at up to 400° C. The temperature rise in the oven was controlled to be no more than an increase of 0.1° C. per minute, at least in the temperature range of 190° C. to 350° C., in order to prevent carbon deposition during the firing process. The final firing temperature, i.e. 400° C. was held for about one-half hour. The results were unsupported titanium ceramic membranes which were visibly transparent.

Various measurements were made to gauge the size of the particles during the formation process to gauge the size of the pores in the membrane. The precursor sols were tested by a quasi-elastic light scattering technique and were found to contain $TiO_2$ particles which were less than 5 nanometers in diameter. Transmission electron microscopy of the dried gel revealed that the gel was composed of quantum-sized particles, of less than 3 nm in diameter. BET measurement indicates that one of the membranes, fired at 250° C., has a mean pore diameter of 14 Angstroms with an extremely narrow distribution of pore size. The BET measurement also showed a large specific surface area, i.e. 264 square meters per gram, and high porosity, i.e. 39%.

The same procedure was repeated with the same molarity of titanium in the solution and molar ratios of water to titanium of from 1:1 to 10:1, with best results being obtained at 6:1 for 0.2M titanium. Ratios in the range of 2:1 to 7:1 yielded reasonable results. With higher levels of water present, the titanium dioxide tended to precipitate, resulting in larger than desired particle size. For 0.4M titanium, and varied ratios of water to titanium, it was found that water to titanium ratios in excess of 3:1 resulted in precipitation. This critical and interrelated factor appeared to be both the molarity of the titanium and the ratio of water to titanium, with the water ratio needing to be lower if more titanium was present. This observation is consistent with the model that the system is effective in creating small particle size, and small pores, due to the limitation in the availability of the water molecules to the titanium atoms and in the titanium particles to other titanium particles.

Particulate $ZrO_2$ Membranes

Again a supply of the precursor tert-amyl oxide was prepared by an alcohol exchange reaction from commercially available zirconium tetra-propoxide ($Zr(OPr^n)_4$) (70% propanol, Aldrich) with tert-amyl alcohol (Aldrich) in benzene solvent to yield zirconium tetra-tert-amyloxide and propanol. By distillation, propanol was removed with benzene as an azeotrope at 77.1° C. Complete removal of propanol was desired. Excess benzene was removed by subsequent distillation over 80° C. The yellow solid product was tested by NMR spectrum and found to have in excess of 95% of the propoxyl groups replaced by tert-amyl groups. Thus the equation paralleled equation 1, above, with zirconium substituted for titanium. The product was then mixed with t-AmOH to make a 1.1M solution.

The zirconium alkoxide and water were separately dissolved in equal amounts of tert-amyl alcohol. The two solutions were then mixed by dropping the H₂O part into the alkoxide part over 15 minutes. Two concentrations of solution were made, one 0.2M $Zr(OAm^t)_4$ and 0.2 M H₂O and the other 0.1 M $Zr(OAm^t)_4$ and 0.2 M H₂O. The solutions were aged by stirring for two hours.

The transparent sols thus produced were then placed in plastic dishes for gellation, which was accomplished by slow alcohol evaporation carried out for about one week in a desiccator box. The gels were then fired in air at up to 400° C. to result in a transparent unsupported $ZrO_2$ membrane. The hydrolyzed clear sols were also used for coating a glass support. A transparent crack-free film seven layers thick, which had a total thickness of about 1 micron, was obtained using a spin-coating technique.

Again measurements were made to ascertain the size of the particles and the pores in the membrane. The precursor sols were tested by a quasi-elastic light scattering technique and found to contain $ZrO_2$ particles having sizes less than 5 nm in diameter. Nitrogen adsorption measurements of the membranes fired between 200° and 350° C. indicated a mean pore diameter of 14 Angstroms. An x-ray diffraction study revealed the membrane to be completely amorphous.

Particulate Mixed Titanium and Zirconium Membranes

Both the titanium tert-amyl alcohol and the zirconium tert-amyl alcohol were prepared from commercial materials by the alcohol exchange methods described above. The metal alkoxides were mixed in rations of 10% and 20% zirconium. The concentrations of total metal atoms used were half the concentration of water molecules.

An unsupported $Zr_{0.1}Ti_{0.9}O_2$ membrane was made by stirring 540 µls of 1.1M $Zr(OAm^t)_4$ solution and 1.76 gm Ti $(OAm^t)_4$ into 12.8 ml tert-amyl alcohol, followed by stirring for one hour. Separately 220 µls of H₂O was dissolved in another 15 ml of AmOH. Then the water solution was dripped into the metal solution. The final transparent sol had 0.02 Zr, 0.18 Ti and 0.4 M H₂O. The solution was stirred for two hours. The sol was then poured into plastic dishes and placed in a desiccator box for three weeks. The gels were then removed and fired by slow temperature increase (2° C./min) up to 400° C. and baked at 400° C. for one-half hour. The resulting unsupported membranes were transparent. Testing of the sols by quasi-electric light scattering technique indicated Zr-Ti oxide particles having sizes less than 5nm.

The membrane was measured by nitrogen adsorption and found to have a mean pore diameter of less than 16 Angstroms with an extremely narrow pore size distribution. BET results revealed a large surface area of 200–300 m²/gm and a porosity in the range of 30–35%, consistent with the close packing model. X-ray diffraction revealed the membranes to be amorphous.

Supported $Zr_{0.1}Ti_{0.9}O_2$ membranes were made on a glass substrate by first dissolving 1 ml 1.1 Zr (O Am$^r$)$_4$ and 3.31 gm Ti(O Am$^r$)$_4$ into 10.6 ml tert-AmOH, followed by stirring for one hour. Separately 414 μls of $H_2O$ were dissolved in another 15 ml AmOH. The water solution was dripped into the metal alcohol solution with violent stirring. The final transparent sol contained 0.038 M Zr, 0.34 M Ti, and 0.76 M $H_2O$. The solution was stirred for two hours and then coated onto prewashed microscope slides of size 1.3×4 inch (VWR Scientific). One side of the glass slide was coated by spin coating, followed by firing at 200° C. for 15 minutes. Up to seven layers of coating of 1 micron each were made without cracking. Finally the membranes were fired at 550° C. for one hour to make a transparent porous membrane.

We claim:

1. A composition of matter comprising a porous, transparent titanium dioxide ceramic membrane having a mean pore diameter of less than 40 Angstroms and a surface area available for contact of a filtrate in excess of 200 sq. m/g.

2. A composition of matter as claimed in claim 1 wherein the mean pore diameter is greater than 5 Angstroms.

3. A composition of matter comprising a porous, transparent metal oxide ceramic membrane having a mean pore diameter of less than 40 Angstroms, a metal selected from the group consisting of transition metals and mixtures thereof and a surface area available for contact of a filtrate in excess of 200 sq. m/g.

4. A composition of matter as claimed in claim 3 wherein the mean pore diameter is greater than 15 Angstroms.

* * * * *